United States Patent
Pun et al.

(10) Patent No.: US 9,706,201 B2
(45) Date of Patent: Jul. 11, 2017

(54) REGION-BASED PROCESSING OF PREDICTED PIXELS

(71) Applicant: Apple Inc., Cupertino, CA (US)

(72) Inventors: Thomas Pun, San Jose, CA (US); Paul Chang, San Jose, CA (US); Hsi-Jung Wu, San Jose, CA (US)

(73) Assignee: APPLE INC., Cupertino, CA (US)

( * ) Notice: Subject to any disclaimer, the term of this patent is extended or adjusted under 35 U.S.C. 154(b) by 28 days.

(21) Appl. No.: 14/723,264

(22) Filed: May 27, 2015

(65) Prior Publication Data

US 2015/0334391 A1    Nov. 19, 2015

Related U.S. Application Data

(63) Continuation of application No. 13/562,229, filed on Jul. 30, 2012, now Pat. No. 9,049,451, which is a
(Continued)

(51) Int. Cl.
*H04N 19/105* (2014.01)
*H04N 19/182* (2014.01)
(Continued)

(52) U.S. Cl.
CPC ......... *H04N 19/105* (2014.11); *H04N 19/102* (2014.11); *H04N 19/134* (2014.11);
(Continued)

(58) Field of Classification Search
CPC .. H04N 19/176; H04N 19/172; H04N 19/103; H04N 19/44; H04N 19/105; H04N 19/119; H04N 19/122
See application file for complete search history.

(56) References Cited

U.S. PATENT DOCUMENTS 3,716,851 A    2/1973   Neumann
4,023,110 A    5/1977   Oliver
(Continued)

FOREIGN PATENT DOCUMENTS

WO    WO2005076218    *   8/2005

OTHER PUBLICATIONS

He et al. "Low-delay rate control for DCT video coding via ρ-domain source modeling," IEEE Trans. on Circuits and Systems for Video Technology, Aug. 2001, vol. 11, No. 8.
(Continued)

*Primary Examiner* — Hung Dang
*Assistant Examiner* — Sunghyoun Park
(74) *Attorney, Agent, or Firm* — Baker Hostetler LLP; Robert L. Hails

(57) ABSTRACT

A method for decoding a compressed video data sequence containing one or more coded pixel blocks. The compressed video sequence is buffered. Prediction information for each of the coded pixel blocks is reviewed. One or more groups of coded pixel blocks are formed based on the reviewed prediction information such that the coded pixel blocks within a given group have similar prediction dependencies and/or at least do not depend on a reconstructed pixel within a group of received pixel blocks to enable parallel decoding. The formed groups are scheduled for processing and subsequently decoded to produce a decoded video data sequence.

21 Claims, 6 Drawing Sheets

Related U.S. Application Data continuation of application No. 11/462,449, filed on Aug. 4, 2006, now Pat. No. 8,233,535.

(60) Provisional application No. 60/737,772, filed on Nov. 18, 2005.

(51) Int. Cl.

| | | |
|---|---|---|
| *H04N 19/52* | (2014.01) | |
| *H04N 19/176* | (2014.01) | |
| *H04N 19/46* | (2014.01) | |
| *H04N 19/134* | (2014.01) | |
| *H04N 19/102* | (2014.01) | |
| *H04N 19/61* | (2014.01) | |
| *H04N 19/157* | (2014.01) | |
| *H04N 19/44* | (2014.01) | |
| *H04N 19/436* | (2014.01) | |

(52) U.S. Cl.
CPC ......... *H04N 19/157* (2014.11); *H04N 19/176* (2014.11); *H04N 19/182* (2014.11); *H04N 19/436* (2014.11); *H04N 19/44* (2014.11); *H04N 19/46* (2014.11); *H04N 19/52* (2014.11); *H04N 19/61* (2014.11)

(56) References Cited

U.S. PATENT DOCUMENTS

| | | |
|---|---|---|
| 4,131,765 A | 12/1978 | Kahn |
| 4,217,609 A | 8/1980 | Hatori et al. |
| 4,394,774 A | 7/1983 | Wildergren et al. |
| 4,437,119 A | 3/1984 | Matsumoto et al. |
| 4,670,851 A | 6/1987 | Murakami et al. |
| 4,698,672 A | 10/1987 | Chen et al. |
| 4,760,446 A | 7/1988 | Ninomiya et al. |
| 4,837,618 A | 6/1989 | Hatori et al. |
| 4,864,393 A | 9/1989 | Harradine |
| 4,901,075 A | 2/1990 | Vogel |
| 5,010,401 A | 4/1991 | Murakami et al. |
| 5,021,879 A | 6/1991 | Vogel |
| 5,068,724 A | 11/1991 | Krause et al. |
| 5,091,782 A | 2/1992 | Krause et al. |
| 5,093,720 A | 3/1992 | Krause et al. |
| 5,113,255 A | 5/1992 | Nagata et al. |
| 5,168,375 A | 12/1992 | Reisch et al. |
| 5,175,618 A | 12/1992 | Ueda et al. |
| 5,223,949 A | 6/1993 | Honjo |
| 5,260,783 A | 11/1993 | Dixit |
| 5,293,229 A | 3/1994 | Iu |
| 5,298,991 A | 3/1994 | Yagasaki et al. |
| 5,317,397 A | 5/1994 | Odaka et al. |
| 5,329,318 A | 7/1994 | Keith |
| 5,343,248 A | 8/1994 | Fujinami |
| 5,377,051 A | 12/1994 | Lane et al. |
| 5,412,430 A | 5/1995 | Nagata |
| RE34,965 E | 6/1995 | Sugiyama |
| 5,428,396 A | 6/1995 | Yagasaki et al. |
| RE35,093 E | 11/1995 | Wang et al. |
| 5,469,208 A | 11/1995 | Dea |
| 5,469,212 A | 11/1995 | Lee |
| RE35,158 E | 2/1996 | Sugiyama |
| 5,497,239 A | 3/1996 | Kwon |
| 5,510,840 A | 4/1996 | Yonemitsu et al. |
| 5,539,466 A | 7/1996 | Igarashi et al. |
| 5,543,843 A | 8/1996 | Kato |
| 5,543,847 A | 8/1996 | Kato |
| 5,557,330 A | 9/1996 | Astle |
| 5,557,684 A | 9/1996 | Wang et al. |
| 5,559,557 A | 9/1996 | Kato |
| 5,565,920 A | 10/1996 | Lee et al. |
| 5,568,200 A | 10/1996 | Pearlstein et al. |
| 5,587,806 A | 12/1996 | Yamada et al. |
| 5,625,355 A | 4/1997 | Takeuo et al. |
| 5,648,733 A | 7/1997 | Worrell et al. |
| 5,654,706 A | 8/1997 | Jeong |
| 5,666,461 A | 9/1997 | Igarashi et al. |
| 5,668,600 A | 9/1997 | Lee |
| 5,684,534 A | 11/1997 | Harney et al. |
| 5,703,646 A | 12/1997 | Oda |
| 5,711,012 A | 1/1998 | Bottoms et al. |
| 5,719,986 A | 2/1998 | Kato et al. |
| 5,831,688 A | 11/1998 | Yamada et al. |
| 5,841,939 A | 11/1998 | Takahashi et al. |
| 5,852,664 A | 12/1998 | Iverson et al. |
| 5,887,111 A | 3/1999 | Takahashi et al. |
| 5,917,954 A | 6/1999 | Girod et al. |
| 5,929,916 A | 7/1999 | Legall et al. |
| 5,946,043 A | 8/1999 | Lee et al. |
| 5,949,948 A | 9/1999 | Krause et al. |
| 5,991,447 A | 11/1999 | Eifrig et al. |
| 5,991,503 A | 11/1999 | Miyasaka et al. |
| 6,052,507 A | 4/2000 | Nilda et al. |
| 6,064,776 A | 5/2000 | Kikuchi et al. |
| 6,081,296 A | 6/2000 | Fukunaga et al. |
| 6,081,551 A | 6/2000 | Etoh |
| RE36,761 E | 7/2000 | Fujiwara |
| 6,088,391 A | 7/2000 | Auld et al. |
| 6,115,070 A | 9/2000 | Song et al. |
| 6,125,146 A | 9/2000 | Frencken et al. |
| 6,141,383 A | 10/2000 | Yu |
| 6,144,698 A | 11/2000 | Poon et al. |
| 6,144,700 A * | 11/2000 | Kim ................. G06T 5/002 375/240.03 |
| 6,167,087 A | 12/2000 | Kato |
| 6,169,821 B1 | 1/2001 | Fukunaga et al. |
| 6,188,725 B1 | 2/2001 | Sugiyama |
| 6,217,234 B1 | 4/2001 | Dewar et al. |
| 6,256,420 B1 | 7/2001 | Sako et al. |
| 6,563,549 B1 | 5/2003 | Sethuraman |
| 6,591,016 B2 | 7/2003 | Fert et al. |
| 6,873,654 B1 | 3/2005 | Rackett |
| 7,158,570 B2 | 1/2007 | Nagumo et al. |
| 7,409,097 B2 | 8/2008 | Zhang et al. |
| 7,535,959 B2 | 5/2009 | Lightstone et al. |
| 7,693,220 B2 | 4/2010 | Wang et al. |
| 2002/0168012 A1 | 11/2002 | Ramaswamy |
| 2003/0123552 A1 | 7/2003 | Prakash et al. |
| 2004/0008766 A1* | 1/2004 | Wang .................. H04N 19/105 375/240.01 |
| 2004/0017951 A1 | 1/2004 | Koto et al. |
| 2004/0233995 A1 | 11/2004 | Abe et al. |
| 2005/0053295 A1* | 3/2005 | Holcomb ............. H04N 19/70 382/236 |
| 2005/0105809 A1* | 5/2005 | Abe .................... H04N 19/105 382/236 |
| 2005/0169374 A1* | 8/2005 | Marpe ................. H04N 19/176 375/240.16 |
| 2005/0201470 A1* | 9/2005 | Sievers ................. H04N 19/50 375/240.24 |
| 2005/0265450 A1 | 12/2005 | Raveendran et al. |
| 2005/0265452 A1* | 12/2005 | Miao ................... H04N 19/105 375/240.16 |
| 2005/0286631 A1 | 12/2005 | Wu et al. |
| 2006/0013298 A1 | 1/2006 | Tong et al. |
| 2006/0104360 A1 | 5/2006 | Gordon |
| 2006/0168284 A1 | 7/2006 | Holthe |
| 2006/0222085 A1* | 10/2006 | Kishore ............... H04N 19/174 375/253 |
| 2007/0025447 A1* | 2/2007 | Kojokaro ............. H04N 19/139 375/240.24 |
| 2008/0256091 A1* | 10/2008 | Kampmann ......... H04N 19/159 |

OTHER PUBLICATIONS

He et al., "Optimum bit allocation and accurate rate control for video coding via ρ-domain source modeling," IEEE Trans. on Circuits and Systems for Video Technology, Oct. 2002, pp. 840-849, vol. 12, No. 10.

He et al., "A unified rate-distortion analysis framework for transform coding," IEEE Trans. on Circuits and Systems for Video Technology, Dec. 2001, pp. 1221-1236, vol. 11, No. 12.

(56) References Cited

OTHER PUBLICATIONS

Wei, "Joint encoder and channel rate control of VBR video over ATM networks," IEEE Trans. on Circuits and Systems for Video Technology, Apr. 1997, pp. 266-278, vol. 7, No. 2.

Wei et al., "Rate control of MPEG video coding and recording by Rate-Quantization modeling," IEEE Trans. on Circuits and Systems for Video Technology, Feb. 1996, pp. 12-20, vol. 6, No. 1.

Pao et al., "Encoding stored video for streaming applications," IEEE Trans. on Circuits and Systems for Video Technology, Feb. 2001, pp. 199-209, vol. 11, No. 2.

Ribas-Corbera et al., "A frame-layer bit allocation for H.263+," IEEE Trans. on Circuits and Systems for Video Technology, Oct. 2000, pp. 1154-1158, vol. 10, No. 7.

Yang et al., "Rate control for VBR video over ATM: Simplification and implementation," IEEE Trans. on Circuits and Systems for Video Technology, Sep. 2001, pp. 1045-1058, vol. 11, No. 9.

Aramvith et al., "A rate-control for video transport over wireless channels," IEEE Trans. on Circuits and Systems for Video Technology, May 2001, pp. 569-580, vol. 11, No. 5.

Boroczky et al., "Joint rate control with look-ahead for multi-program video coding," IEEE Trans. on Circuits and Systems for Video Technology, Oct. 2000, pp. 1159-1163, vol. 10, No. 7.

Ribas-Corbera et al., "Rate control in DCT video coding for low-delay communications," IEEE Trans. on Circuits and Systems for Video Technology, Feb. 1999, pp. 172-185, vol. 9, No. 1.

Cheng et al., "Rate control for an embedded wavelet video coder," IEEE Trans. on Circuits and Systems for Video Technology, Aug. 1997, pp. 696-702, vol. 7, No. 4.

Fan et al., "An active scene analysis-based approach for pseudoconstant bit-rate video coding," IEEE Trans. on Circuits and Systems for Video Technology, Apr. 1998, pp. 159-170, vol. 8, No. 2.

Jagmohan et al., "MPEG-4 one-pass VBR rate control for digital storage," IEEE Trans. on Circuits and Systems for Video Technology, May 2003, pp. 447-452, vol. 13, No. 5.

Vetro et al., "MPEG-4 rate control for multiple object coding," IEEE Trans. on Circuits and Systems for Video Technology, Feb. 1999, pp. 186-199, vol. 9, No. 1.

Ronda et al., "Rate control and bit allocation for MPEG-4," IEEE Trans. on Circuits and Systems for Video Technology, Dec. 1999, pp. 1243-1258, vol. 9, No. 8.

Lee et al., "Scalable rate control for MPEG-4 video," IEEE Trans. on Circuits and Systems for Video Technology, Sep. 2000, pp. 878-894, vol. 10, No. 6.

Pan et al., "A study of MPEG-4 rate control scheme and its improvements," IEEE Trans. on Circuits and Systems for Video Technology, May 2003, pp. 440-446, vol. 13, No. 5.

Lee et al., "Bit allocation for MPEG-4 video coding with spatio-temporal tradeoffs," IEEE Trans. on Circuits and Systems for Video Technology, Jun. 2003, pp. 488-502, vol. 13, No. 6.

Puri & Chen, editors, Multimedia Systems, Standards, and Networks, Chapter 3, pp. 55-64, Marcel Dekker, Inc., New York, 2000.

"Coding of Moving Pictures and Associated Audio Information", ISO/JEC JTC1/SC29WG11 Video Group, Feb. 1996.

Haskell, Barry G.; Puri, Atul; and Netravali, Arun N.; "Digital Video: An Introduction to MPEG-2", Digital Multimedia Standards Series, pp. 33-54, 80-182, 369-411, Chapman & Hall, 1997.

Mitchell, Joan.; Pennebaker, William B.; Fogg, Chad E.; and LeGall, Didier J.; "MPEG Video Compression Standard" Digital Multimedia Standards Series, pp. 17-32 and 81-103, 333-356, Chapman & Hall, 1996.

Ghanbari, "Standard Codecs: Image Compression to Advanced Video Coding", pp. 155-156, The Institute of Electrical Engineers, London, UK, Jul. 2003.

\* cited by examiner

REGION-BASED PROCESSING OF PREDICTED PIXELS

CROSS REFERENCE TO RELATED APPLICATIONS

This application claims priority to U.S. Provisional Patent Application No. 60/737,772, filed Nov. 18, 2005, herein incorporated by reference in its entirety.

BACKGROUND OF THE INVENTION

Field of the Invention

The present invention generally relates to video encoders. More specifically, the present invention provides the grouping of coded pixel blocks having similar prediction dependencies to more quickly decode a compressed video data sequence.

Background Art

FIG. 1 is a functional block diagram of an encoder-decoder system 100. The encoder-decoder system 100 includes an encoder 102 and a decoder 104. The encoder 102 receives source video data from a video source 106. The encoder 102 codes the source video data into a compressed bit stream for transmission to the decoder 104 over a communication channel 105. The communication channel 108 can be a real-time delivery system such as a communication network (e.g., a wireless communication network) or a computer network (e.g., the Internet). Alternatively, the communication channel 106 can be a storage medium (e.g., an electrical, optical or magnetic storage device) that can be physically distributed. Overall, the topology, architecture and protocol governing operation of the communication channel 108 is immaterial to the present discussion unless specifically identified herein.

The decoder 104 receives and decodes the compressed bit stream to reproduce the source video data. The decoder 104 can then provide the reproduced source video data to a video display device 110. FIG. 1 shows a single decoder 104 but is not limited as such. That is replicas or copies of the compressed bit stream can be provided to multiple decoders located at different locations. In this way, the source video data can be encoded once and distributed to the decoders for decoding at different times as is conventional or well known in the art.

The encoder 102 and the decoder 104 can be implemented in hardware, software or some combination thereof. For example, the encoder 102 and/or the decoder 104 can be implemented using a computer system. FIG. 2A is a simplified functional block diagram of a computer system 200. The computer system 200 can be used to implement the encoder 102 or the decoder 104 depicted in FIG. 1.

As shown in FIG. 2A, the computer system 200 includes a processor 202, a memory system 204 and one or more input/output (I/O) devices 206 in communication by a communication 'fabric.' The communication fabric can be implemented in a variety of ways and may include one or more computer buses 208, 210 and/or bridge devices 212 as shown in FIG. 2A. The I/O devices 206 can include network adapters and/or mass storage devices from which the computer system 200 can receive compressed video data for decoding by the processor 202 when the computer system 200 operates as a decoder. Alternatively, the computer system 200 can receive source video data for encoding by the processor 203 when the computer system 200 operates as an encoder.

The computer system 200 can implement a variety of video coding protocols such as, for example, any one of the Moving Picture Experts Group (MPEG) standards (e.g., MPEG-1, MPEG-2, or MPEG-4) and/or the International Telecommunication Union (ITU) H.264 standard. Most coding standards are designed to operate across a variety of computing platforms. Accordingly, many coding standards find application in feature rich computing devices (e.g. personal computers or gaming devices) and also in feature poor computing devices (e.g., single digital signal processing (DSP) devices).

To accommodate the broad variety of computing devices, most coding standards are designed with unsophisticated computer systems in mind. Specifically, many coding standards are designed to be implemented the same way on a feature rich system as they are on a feature poor system. Feature poor systems typically have limited memory and processor capabilities. Accordingly, due to the design of many coding standards, the improved memory and processor capabilities of a feature rich system are not fully exploited. For example, during the coding of an Intra coded frame (I-frame), macroblock data may be coded with reference to other macroblocks in the same frame. A prediction reference (e.g., a prediction vector) can be generated to specify a location from within previously coded macroblocks from which a prediction will be made. This technique can create a long chain of predictions, requiring macroblocks to be retrieved from memory and then decoded in a serial fashion (e.g. one macroblock at a time).

FIG. 2B illustrates the contents of the memory system 204 depicted in FIG. 2A. As shown in FIG. 2B, the memory system 204 can include coded video data 220, decoded reference frames 222 and a currently decoded frame 224 that is partially decoded. The decoded reference frames 222 can include previous reference frames 226 and future reference frames 228. Previous reference frames 226 are frames that occur earlier in time than the current frame being decoded by the processor 202. Future reference frames 228 are frames that occur later in time than the current frame being decoded by the processor 202. A currently decoded frame 224 can depend on previous reference frames 226 and/or future reference frames 228.

In feature poor computing devices, the decoded reference frames 222 needed by the processor 202 to decode a current frame 224 may take several memory cycles to retrieve since the bandwidth of a memory system 204 in a feature poor computing device is generally limited. Further, due to the serial nature of decoding the coded data 220, different sets of decoded reference frames 222 may be retrieved for each coded video frame 220. This can result in the same decoded reference frames 222 being retrieved several times as the coded video data 220 is decoded.

As previously mentioned, feature rich computing devices typically possess much greater memory capacity and memory bandwidth in comparison to feature poor devices. Accordingly, these devices are able to access, retrieve and process data in quantities much larger than a single macroblock at a time. Theoretically, the performance of a feature rich computing device implementing a coding standard is much greater than what is currently achieved. Performance is limited due to the serial nature of decoding. In particular, performance is mainly limited by (a) the processor being idle when macroblock data is being read in from a memory device or I/O device because the processor needs prediction data contained in data yet to be retrieved; and (b) the memory device or I/O device being idle because the processor is busy decoding data that requires large amounts of processing.

Accordingly, what is needed is a processing system capable of exploiting the improved processor and memory capabilities of feature rich computing devices to more quickly decode video data compressed according to conventional coding techniques. In particular, the processing system should be capable of reading and decoding multiple chunks of video data (e.g., multiple macroblocks or multiple blocks of pixels) whenever possible.

BRIEF DESCRIPTION OF THE DRAWINGS

The accompanying drawings illustrate the present invention and, together with the description, further serve to explain the principles of the invention and to enable one skilled the pertinent art to make and use the invention.

DETAILED DESCRIPTION OF THE INVENTION

Embodiments of the present invention provide systems, apparatuses and methods whereby groups of coded pixel blocks having similar prediction dependencies are defined and efficiently scheduled for decoding. In this regard, the present invention enables a compressed video data sequence to be decoded in less time and with less power by leveraging improved processor and memory capabilities. A group of coded pixel blocks having similar prediction dependencies is understood to mean coded pixel blocks that can share a motion vector or reference frame or that do not depend on a reconstructed pixel block within the group.

Figure 3:
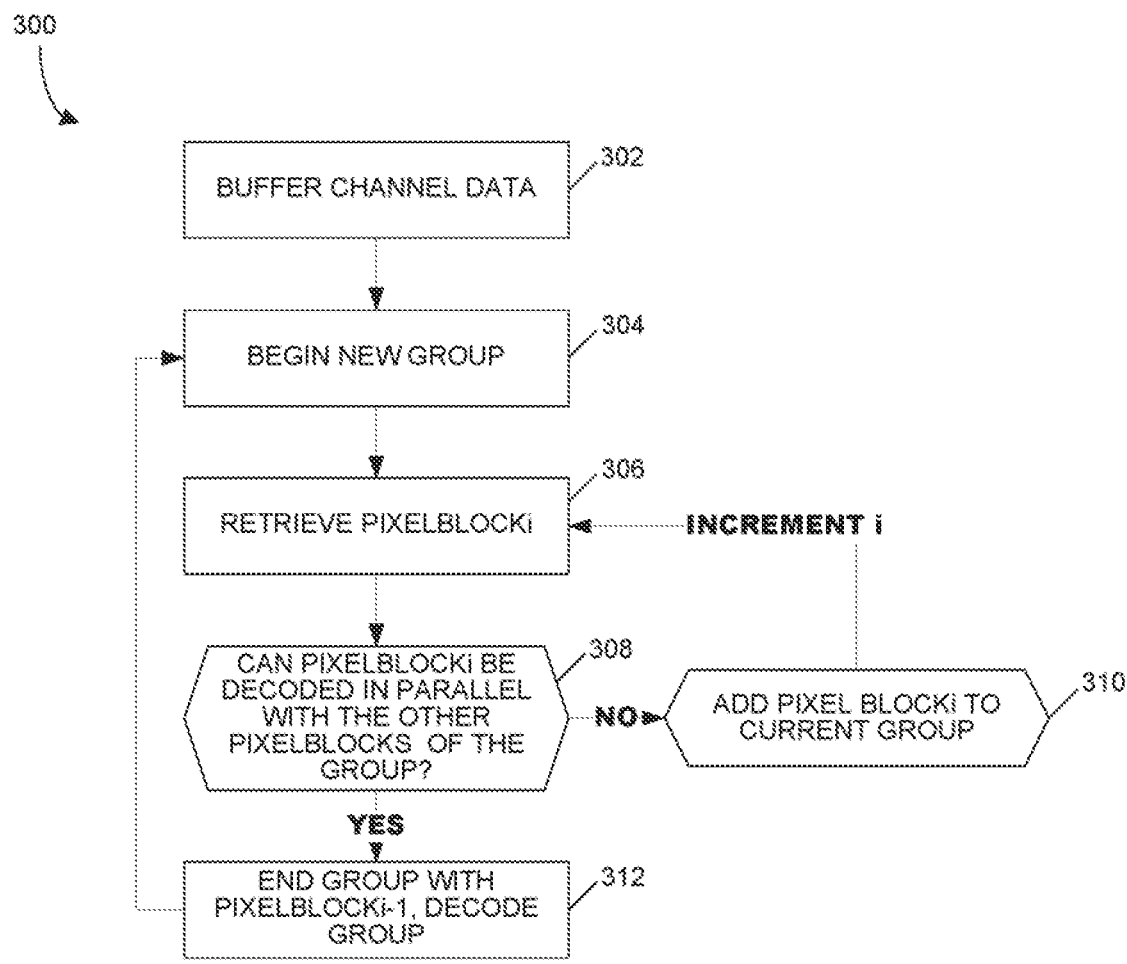
FIG. 3 provides a flowchart illustrating a method for grouping pixel blocks together so that the group can be processed together more quickly according to an aspect of the present invention.

FIG. 3 provides a flowchart 300 illustrating a method for grouping pixel blocks together (e.g., grouping pixel blocks together that have similar prediction dependencies) so that the group can be processed together more quickly, according to an aspect of the present invention.

At step 302, a processor of a decoder can buffer channel data in a memory. The channel data can be compressed video data. The processor and memory can be components of a computer system operating as decoder. The implemented decoder can operate according to or be operable with various video compression standards such as, for example, any one of the Moving Picture Experts Group (MPEG) standards (e.g., MPEG-1, MPEG-2, or MPEG-4) and/or the International Telecommunication Union (ITU) H.264 standard. Overall, the compression scheme used by the decoder is immaterial to the present discussion unless specifically identified herein.

At step 304, the processor begins a new group of pixel blocks (e.g., macroblocks) at an arbitrary location and examines the pixel blocks within the buffer. Typically, a new group of pixel blocks begins immediately after the previous group.

At step 306, a pixel block can be retrieved. The current pixel block can be considered the '$i^{th}$' pixel block.

At step 308, the coding parameters of the $i^{th}$ pixel block can be examined to determine if the current pixel block can be decoded in parallel with the other pixel blocks in the group. If the current pixel block does not depend on a reconstructed pixel within the group, then the current pixel block can be added to the current group at step 310. Steps 306 and 308 can then be repeated for additional pixel blocks remaining in the buffer. If the current pixel block does depend on a reconstructed pixel within the group, then the group can be closed at step 312 without including the current pixel block. If the current pixel block does depend on another pixel block within the group (i.e., a reconstructed pixel with the group), then the current pixel block can be considered a non-qualifying pixel block.

Further, at step 312, the group formed can be scheduled for decoding in the manner most efficient for the processor. That is, one or more groups of pixel blocks generated according to the previous steps can be retrieved or read in bulk. Thereafter, the one or more groups of pixel blocks can be processed as additional channel data is fed into the buffer since the one or more groups of pixel blocks do not depend on or require data yet to be retrieved. In this way, the processor and memory system can operate simultaneously, thereby decreasing the time needed to decode a compressed video stream.

In general, the generated groups of coded pixel blocks can be retrieved in any manner. That is, each bulk read operation can include only a portion of a single group (e.g., if a given group is large) or multiple groups (e.g., if some of the included groups are small). This allows any given group of coded pixel block to be retrieved and processed in a chunk size that may be larger, smaller or equal to the group size.

Various groupings of pixel blocks are possible using the method illustrated by the flowchart 300. The groupings can be made on a temporal and/or spatial basis. For example, a group can comprise adjacent intra-frame pixel blocks that can be predicted (and therefore decoded) without using decoded values within the group. A group can also comprise adjacent inter-frame pixel blocks that can be predicted without using decoded values within the group. In this way, it is possible to group together pixel blocks that use multiple reference frames and/or multiple motion vectors. Further, a group can comprise adjacent inter-frame pixel blocks that share one reference frame and/or one motion vector. These grouping decisions can be made, for example, at step 308 using information on the current pixel block retrieved at step 305.

Figure 1:
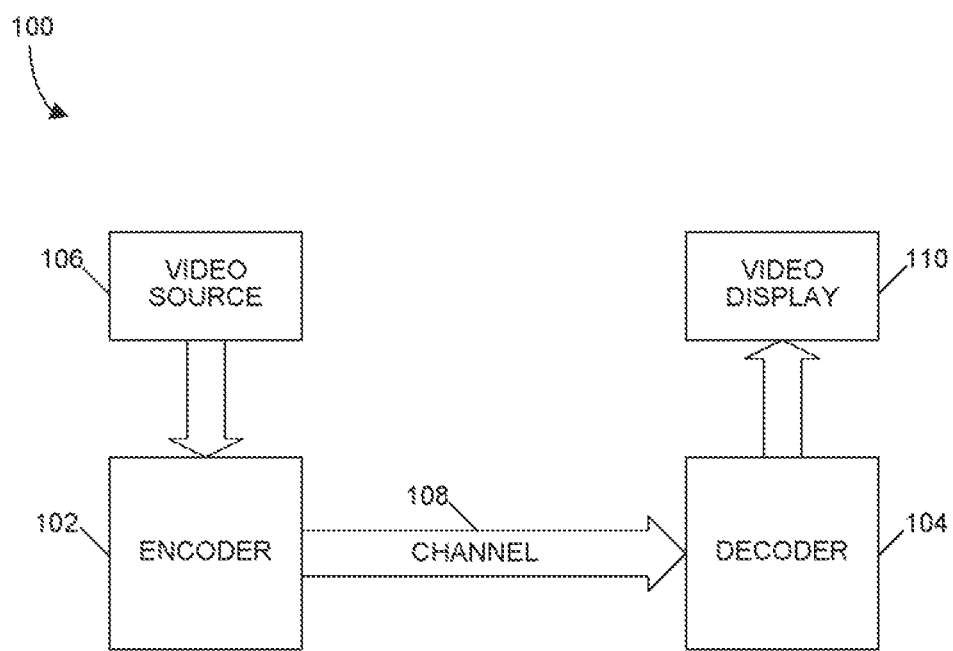
FIG. 1 is a functional block diagram of an encoder-decoder system.
Figure 2A:
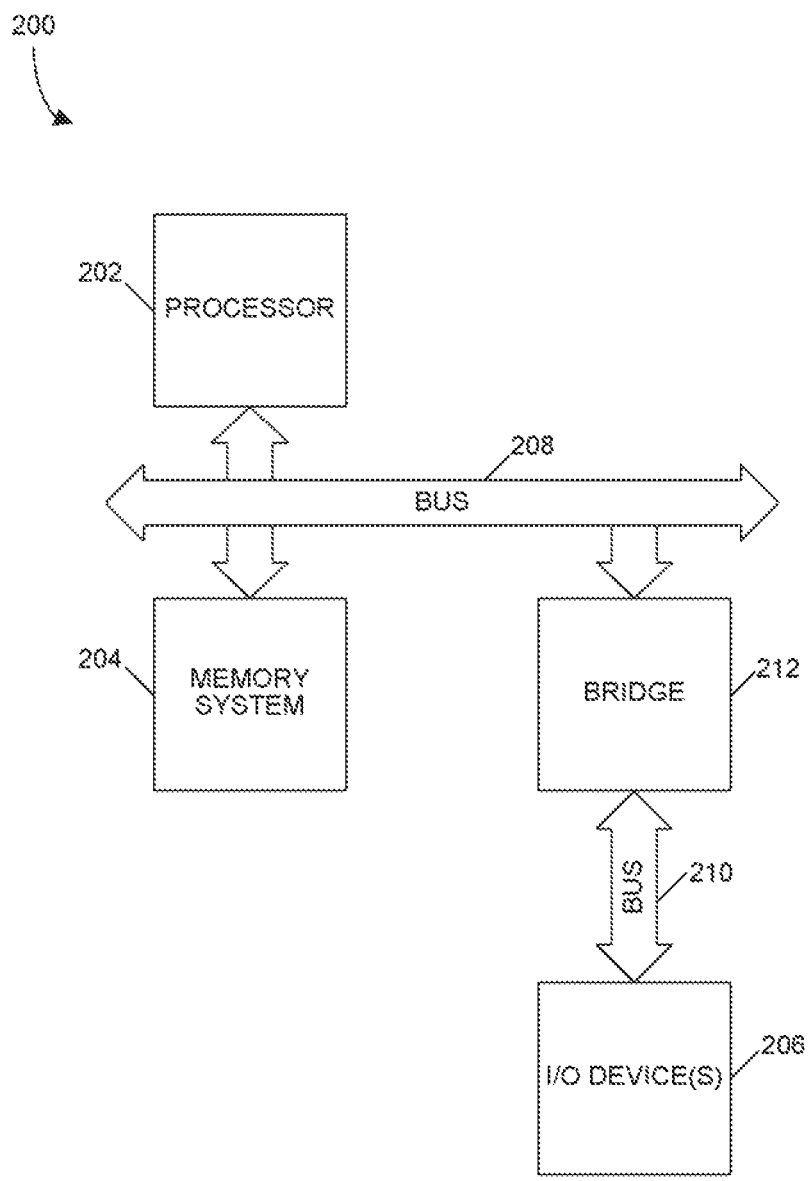
FIG. 2A is a simplified functional block diagram of a computer system.
Figure 2B:
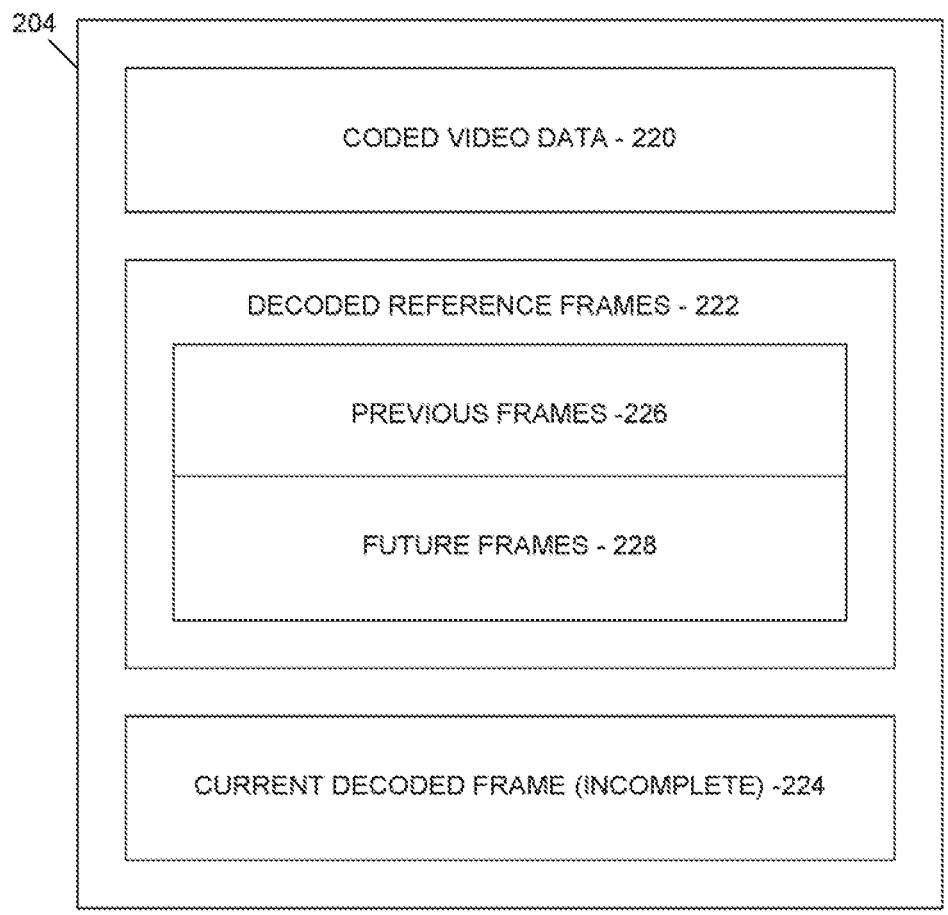
FIG. 2B illustrates the contents of a memory system depicted in FIG. 2A.

FIG. 2A, representing a feature rich computing device, can be used to implement an embodiment of the present invention. The computer system 200 can read from any memory system or location (e.g., a hard drive, cache, etc) when decoding data. Further, these retrieval operations can result in the reading of large amounts of information at a time and is not limited to retrieving or reading a single pixel blocks at a time. Accordingly, an encoder of the present invention can retrieve required decode reference frames 222 in bulk in order to process a group of pixel blocks. For example, all of the decoded reference frames 222 needed to decoded a scheduled group of coded pixel blocks can be retrieved in one memory cycle so as to decrease the time to decode the group of pixel blocks. The ability to more quickly gather all of the information needed for decoding, and to decode efficiently in groups, enables an encoder of the present invention to reduce a time needed to decode a compressed video sequence.

Figure 4:
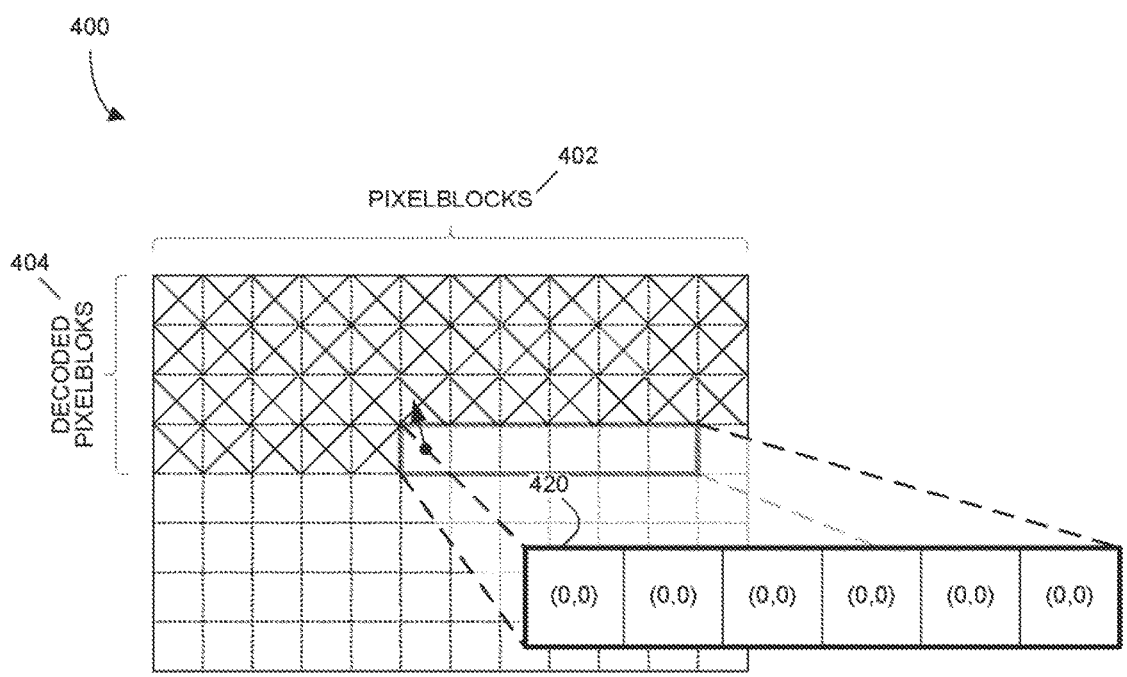
FIG. 4 depicts a frame of video data to illustrate data decoding according to an aspect of the present invention.

FIG. 4 depicts a frame of video data 400 to illustrate data decoding according to an aspect of the present invention. The frame 400 is divided into a plurality of pixel blocks 402. For each pixel block shown, there can be a coded representation of the pixel block stored in a decode buffer. A decoder of the present invention can process the pixel blocks in some kind of order. For example, the decoder can process the pixel blocks serially (e.g., raster scan facsimile).

In FIG. 4, the pixel block group 404 (i.e., those pixel blocks 402 containing an 'X') is depicted as having been decoded. Specifically, the decoder has already read and decoded the coded data representing the pixel block group 404. According to an aspect of the present invention, the decoder defines a new pixel block group 420. The new pixel block group 420 can be defined by the decoder first examining the prediction references of each of the pixel blocks. If the prediction references of an individual pixel block depend on the decoded pixel blocks 404, the pixel block can be added to the new group 420. The new group 420 can be closed or end when it is determined that a currently examined pixel block refers to another pixel block within the new group 420. The newly defined group 420, and therefore the constituent pixel blocks of the group 420, can then be scheduled for decoding.

Figure 5:
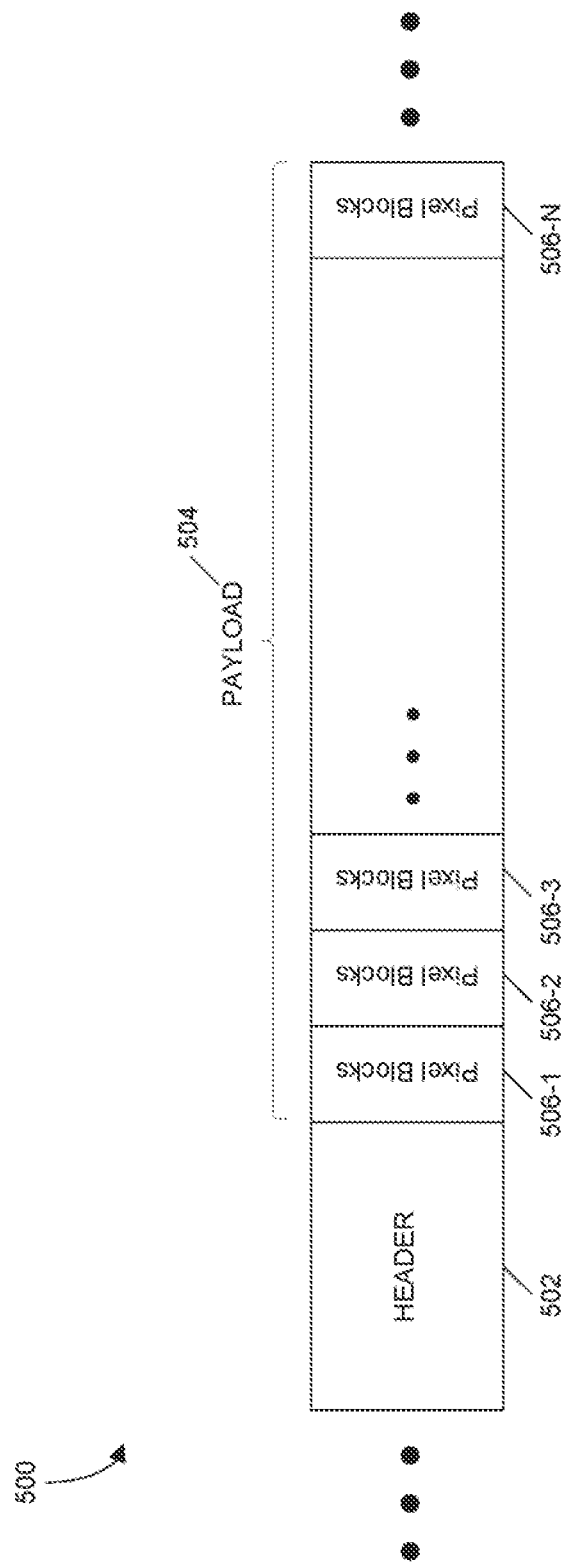
FIG. 5 illustrates a portion of a coded video sequence generated according to an aspect of the present invention.

In an embodiment of the present invention, a bit stream syntax is introduced to identify a group of pixel blocks having similar prediction dependencies. The bit stream syntax and groupings can be generated by an encoder of the present invention. FIG. 5 illustrates a portion of a coded video sequence 500 generated according to an aspect of the present invention. The portion of the coded video sequence 500 can include a header 503 and a payload 504. The portion of the coded video sequence 500 can comprise a portion of a bit stream representing the coded video sequence parsed into portions as shown in FIG. 5. The header 502 can include information regarding the contents of the payload 504. The payload 504 includes a number of pixel blocks (e.g. macroblocks) 506₄ through 506-N. The header 502 is shown prepended to the payload 504 in FIG. 5 but can alternatively be appended to the payload 504.

The pixel blocks 506-1 through 506-N can be grouped together according to prediction dependencies. The pixel blocks 506₄ through 506-N can be grouped together in a number of ways. For example, the payload 504 can be (a) a group of adjacent inter pixel blocks that share a common motion vector and/or reference frame; (b) a group of adjacent inter pixel blocks that can be predicted without using decoded values within the group; (c) a group of adjacent intra pixel blocks that can be predicted without using decoded values within the group; or (d) a group of pixel blocks that do not depend on any reconstructed pixel from the group of pixel blocks. In this way, the present invention allows the formation of a group of pixel blocks for decoding that do not share a motion vector or a reference frame. The payload 502 can include a variety of information on the characteristics of the payload 504 and/or its constituent components. For example, the payload 504 can include information indicating the type of grouping carried by the payload 504 as well as the number of pixel blocks 506 within the payload. A header 502 can be associated with each payload 504 comprising the compressed bit stream and can be considered a group identifier of the payload 504. Further, the compressed bit stream can comprise payloads 504 of different types distributed throughout the compressed bit stream in any manner.

An encoder of the present invention can generate the payload group 504 and the header 502 as shown in FIG. 4. For example, after receiving and coding an uncompressed video sequence to produce a coded video sequence, an encoder of the present invention can scan the coded video sequence to form multiple payload groups 504 and associated headers 502 to form a formatted coded video sequence. The formatted coded video sequence can then be provided to a decoder of the present invention. The decoder can process and decode the formatted and coded video sequence quickly to reproduce the original uncompressed video sequence since the coded video sequence is provided in chunks having similar prediction dependencies and/or at least do not depend on a reconstructed pixel within a group of received pixel blocks. Accordingly, the decoder can more efficiently schedule retrieval and processing of the coded and formatted video sequence stored, for example, in an associated decoder buffer.

As a two-step process, generation of a formatted coded video sequence can be used to optimize the original coding of the video sequence. The generation of a formatted coded video sequence can also be produced using a one-step process whereby an encoder of the present invention can encode and format a video sequence in a serial fashion. An encoder of the present invention may also adjust the coding and formatting process based on the capabilities of remote decoder that may receive the coded and formatted video data sequence. Further, an encoder of the present invention may be capable of exploiting one or more side channels to send information (e.g., user-defined data and/or encoding/formatting data) to a decoder. In this way, an encoder can provide a decoder with a coded video sequence formatted in such a way (with or without supplemental information) that it can be decoded more easily and more quickly.

CONCLUSION

While various embodiments of the present invention have been described above, it should be understood that they have been presented by way of example and not limitation. It will be apparent to one skilled in the pertinent art that various changes in form and detail can be made therein without departing from the spirit and scope of the invention. Therefore, the present invention should only be defined in accordance with the following claims and their equivalents.

What is claimed is:

1. A method for decoding a compressed video data sequence, comprising:
    buffering the compressed video sequence, the compressed video sequence comprising one or more coded pixel blocks;
    reviewing prediction information of the buffered coded pixel blocks;
    organizing coded pixel blocks into groups based on the reviewed prediction information, wherein coded pixel blocks that are assigned to a common group have prediction references that refer to image content outside of the respective common group;
    scheduling decoding of the coded pixel blocks on a group-by-group basis; and
    decoding the groups of coded pixel blocks according to the group-by-group schedule to produce a decoded video data sequence.

2. The method of claim 1, wherein the prediction information comprises a motion vector.

3. The method of claim 1, wherein the prediction information comprises a reference frame.

4. The method of claim 1, wherein the organizing comprises forming at least one common group comprising coded pixel blocks that can be predicted independently of one another.

5. The method of claim 4, wherein the coded pixel blocks of the at least one group are intra-frame pixel blocks.

6. The method of claim 4, wherein the coded pixel blocks of the at least one group are inter-frame pixel blocks.

7. The method of claim 1, wherein the organizing comprises forming at least one group having coded pixel blocks that share one motion vector and one reference frame.

8. A computer-readable memory having stored thereon a plurality of instructions for decoding a compressed video sequence comprising one or more coded pixel blocks, which when executed by a processor, cause the processor to:
retrieve coding parameters of a coded pixel block;
compare the coding parameters of the coded pixel block to coding parameters of a current group of pixel blocks;
add the coded pixel block to the current group of pixel blocks if the coding parameters of the coded pixel block refer to image content outside of the current group of pixel blocks; and
schedule decoding of the current group of pixel blocks once the current group of pixel blocks is closed, wherein the current group of pixel blocks is closed upon detection of a first non-qualifying coded pixel block that refers to image content inside the current group of pixel blocks.

9. The computer-readable memory of claim 8, further comprising causing the processor to decode a chunk of the current group of pixel blocks.

10. The computer-readable memory of claim 8, wherein the coding parameters of the coded pixel block refer to image content outside of the current group of pixel blocks when the coded pixel block can be predicted independently of other coded pixel blocks within the current group of pixel blocks.

11. The computer-readable memory of claim 10, wherein the current group of pixel blocks comprises one or more inter-frame pixel blocks.

12. The computer-readable memory of claim 10, wherein the current group of pixel blocks comprises one or more intra-frame pixel blocks.

13. A method for encoding a video data sequence, comprising:
coding the video data sequence to generate a coded video sequence comprising one or more coded pixel blocks;
reviewing prediction information for each of the one or more coded pixel blocks;
forming one or more groups of coded pixel blocks based on the reviewed prediction information, wherein coded pixel blocks that are assigned to a common group have prediction references that refer to image content outside of the respective common group; and
associating a group identifier with each common group of coded pixel blocks to form a formatted coded video data sequence.

14. The method of claim 13 wherein coding comprises coding the video data sequence according to any one of the Moving Picture Experts Group (MPEG) standards.

15. The method of claim 13 wherein coding comprises coding the video data sequence according to an International Telecommunication Union (ITU) H.264 standard.

16. The method of claim 13, wherein the forming comprises forming at least one common group having coded pixel blocks that can be predicted independently of one another.

17. The method of claim 16, wherein the coded pixel blocks of the at least one common group are intra frame pixel blocks.

18. The method of claim 16, wherein each group identifier specifies a number of coded pixel blocks contained within an associated common group of coded pixel blocks.

19. The method of claim 13, wherein the coded pixel blocks of the at least one common group are inter frame pixel blocks.

20. A method for decoding a compressed video data sequence, comprising:
buffering the compressed video sequence, the compressed video sequence comprising one or more coded pixel blocks;
reviewing prediction information of the buffered coded pixel blocks;
organizing coded pixel blocks into groups based on the reviewed prediction information, wherein coded pixel blocks that are assigned to a common group refer to image content data outside the respective common group;
scheduling decoding of the coded pixel blocks on a group-by-group basis; and
decoding the groups of coded pixel blocks according to the group-by-group schedule to produce a decoded video data sequence.

21. A method for encoding a video data sequence, comprising:
coding the video data sequence to generate a coded video sequence comprising one or more coded pixel blocks;
reviewing prediction information for each of the one or more coded pixel blocks;
organizing one or more groups of coded pixel blocks into groups based on the reviewed prediction information, wherein coded pixel blocks that are assigned to a common group refer to image content outside the respective common group; and
associating a group identifier with each common group of coded pixel blocks to form a formatted coded video data sequence.

* * * * *